June 19, 1923.
E. MILANI
METHOD OF PRESERVING FOOD PRODUCTS
Filed Sept. 6, 1921
1,459,232
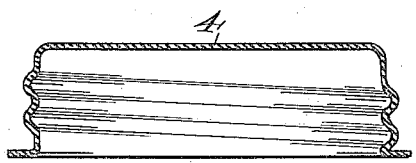
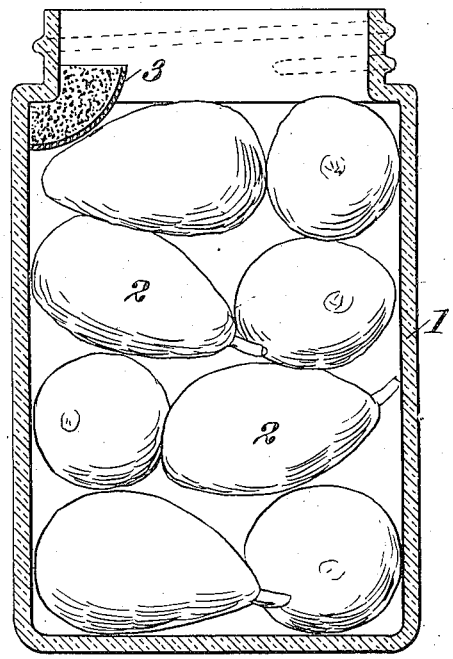
Inventor.
Edward Milani
By Ackert Totten
his attorneys.

Patented June 19, 1923.

1,459,232

UNITED STATES PATENT OFFICE.

EDWARD MILANI, OF SAN FRANCISCO, CALIFORNIA.

METHOD OF PRESERVING FOOD PRODUCTS.

Application filed September 6, 1921. Serial No. 498,714.

*To all whom it may concern:*

Be it known that I, EDWARD MILANI, a citizen of the United States, residing at the city and county of San Francisco and State of California, have invented certain new and useful Improvements in Methods of Preserving Food Products, of which the following is a specification.

The hereinafter described invention relates to a method or process for the preservation of fresh food products, such as fresh fruits, vegetables or meats, and other food products in an uncooked or non-sterilized condition, in order that the fresh fruits or meats may be put up within a sealed container in fresh or ripened condition, and as fresh or uncooked product shipped to distant points or maintained in storage for a period of three or four months, so that when opened the food product will be in the same fresh, ripened conditions as when packed within the container.

In brief, the invention resides in so treating fresh products while confined within a container as to enable the same to maintain its fresh, ripened condition for a period of three or four months after packaging, thereby enabling the producer to place fresh products on the market for a considerable period after it has been sealed as a ripe, uncooked food product, and by so doing overcoming the necessity of picking fruit to be shipped to a distant point in an unripe condition and permitting the same to ripen during its course of travel in order to reach the point of distribution in a substantially ripe condition.

I have discovered that if the fruit generally, as for instance peaches, strawberries and pears and fresh food products, including fresh or uncooked meats, be placed within a suitable container for shipment, and prior to hermetically sealing or closing the same the air contained within the container be burned off by the application of a suitable flame in order to consume all oxygen of the air within the container, and the container be hermetically sealed just prior to the extinguishment of the flame, there will be formed within the container an inert gas, and the food so packed will be maintained against further development, or a ripening beyond the period of ripening in which it was placed within the container. As thus packed and sealed, the raw or uncooked food product may be maintained in the condition in which it was placed within the container for a period of three or four months without changes of any material character taking place relative thereto.

In carrying out the method invention, any suitable form of a container and means for burning or consuming the oxygen of the air contained therein may be employed, and in the accompanying sheet of drawings is illustrated a simple and convenient form of container, which is disclosed in part section with the food product packed therein, the cover closure therefor being illustrated detached therefrom.

In the drawing, the numeral 1 is used to indicate any suitable form of a container, in the present case illustrated as a conventional form of what is known as the "Mason jar" for the containing of fruits, and 2 illustrates the food product packed or placed within the container. After the fruit has been packed within the container, there is applied interiorly thereof a holder 3, which in the present case is filled with sawdust or other absorbent material. This absorbent material contained within the holder is saturated with alcohol, which, when ignited, provides a flame which serves to burn or consume the oxygen of the air within the container, and leaving therein carbon dioxide or an inert gas, the cover or closure 4 being applied to the container just prior to the flame burning itself out, whereby the heated inert gas is confined and hermetically sealed within the container and retards the development of the fresh fruit or other food products hermetically sealed therein. There necessarily will be confined within the container, on the hermetically sealing of the top or cover thereto, certain alcoholic fumes, which may or may not have a preservative effect relative to the food product. This I have not been able to ascertain during the course of my experimentation, but I do know from such experimentation that where the fresh fruit is packed and stored under the method as herein outlined and placed side by side with untreated fresh fruit or food product sealed within a container, the oxygen of the air therein not having been consumed, that at the end of a period of three or four months the food product processed under my invention when removed from the container is in the fresh, ripened condition which it was at the time of packing; whereas the fresh fruit packed and sealed in the same type of container and from which the oxygen of the air therein was not consumed, was on the opening of the container in a spoiled or over-ripe condition.

So far as I know, it is new in the art to process fresh food products and maintain the same in their fresh and ripened condition for a period of several months after processing, and which preservation of the food product in its initial condition is maintained by reason of the oxygen having been consumed from the air contained within the container and prior to the hermetic sealing thereof.

After the sealing of the food product under the described method invention, the hermetically sealed container should be kept within a cooling temperature of approximately 40° Fah. until such time as it is desired to remove the contents of the container.

By the use of the described invention, hermetically sealed containers of fresh food products may be transported to distant points in cans with the minimum of refrigeration, thus materially reducing the cost of transportation and insuring fruit and similar food products being received in perfect condition.

While I have disclosed and illustrated the conventional type of the Mason jar for the packaging of the food products, it will be understood that the carrying out of the method invention is not restricted to such form or type of container, but on the contrary any form of container suitable for the packaging of food products may be employed, and this irrespective as to the size thereof.

Having thus described my invention, what is claimed as new and desired to be protected by Letters Patent is:—

1. The method of packing for storage or transportation purposes fresh food products, which consists in first positioning the food product in a fresh condition within a container, consuming the oxygen of the air contained therein by burning alcohol interiorly of the container, then applying for hermetically sealing a cover to the container prior to an extinguishment of the flame within the container, and then maintaining the container with its sealed product at a cooling temperature.

2. The method of storing fresh food products against deterioration for a predetermined period of time, which consists in packing the said product within a container, then consuming the oxygen of the air within the container by burning alcohol within the container to form therein an inert gas, then during the consuming of the oxygen applying and hermetically sealing a cover to said container.

In testimony whereof I have signed my name to this specification.

EDWARD MILANI.